Jan. 28, 1941. W. P. PROCK 2,230,165
FAN ATTACHMENT FOR LAND VEHICLES
Filed Oct. 12, 1939
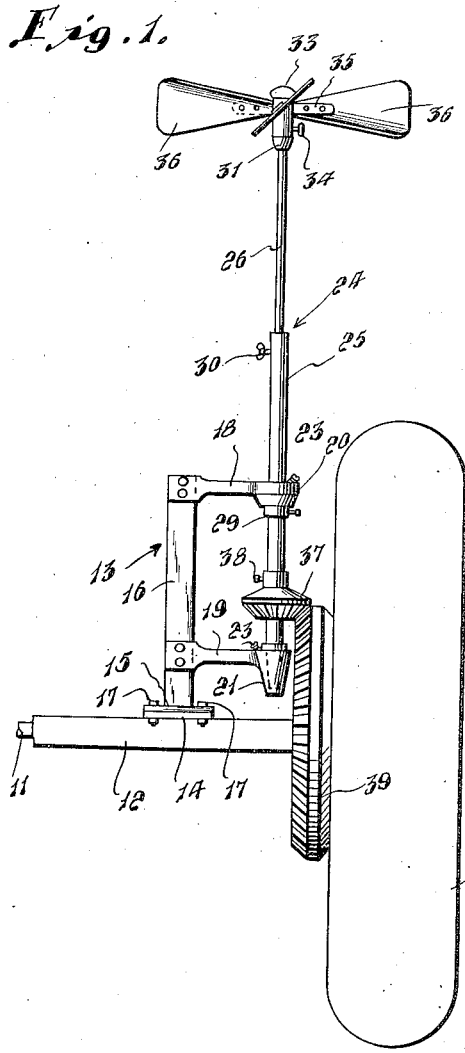
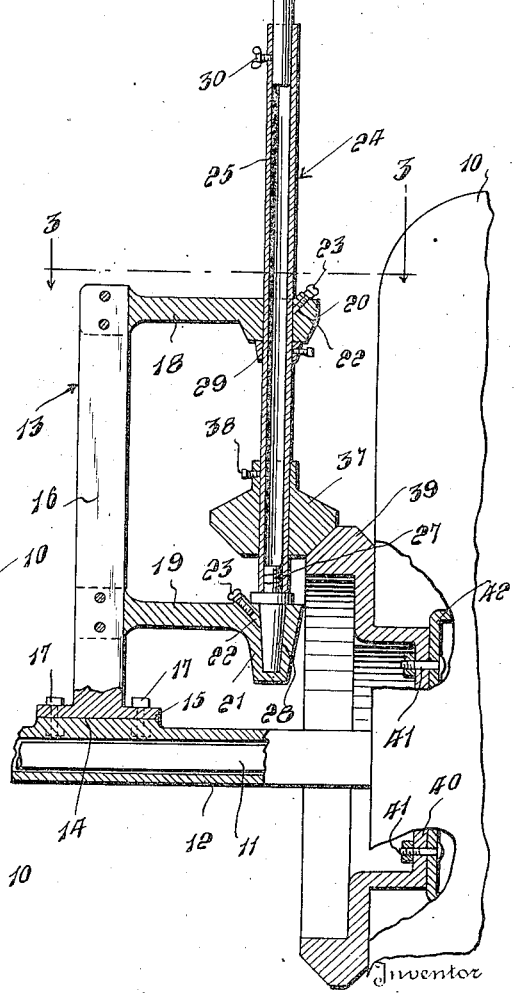
Inventor
William P. Prock
By L. F. Rudolph
Attorney Patented Jan. 28, 1941

2,230,165

UNITED STATES PATENT OFFICE 2,230,165

FAN ATTACHMENT FOR LAND VEHICLES

William Preston Prock, Fresno, Calif., assignor of one-tenth to Jack Allen, and one-tenth to Mae Armstrong, Fresno, Calif.

Application October 12, 1939, Serial No. 299,199

1 Claim. (Cl. 230—249)

This invention relates to an improved fan attachment for land vehicles and is primarily adapted to provide a device for blowing dust away from the operator of a land vehicle, such as a tractor, to eliminate the annoyance and discomfort resulting therefrom.

More particularly, it is an aim of this invention to provide an attachment especially designed for use on farm vehicles and comprising a fan, mounted to be driven from a ground wheel of the vehicle for creating a draft of air to carry dust away from the operator of the vehicle.

In dry dusty sections of the country, particularly in prairie country, operators of farm vehicles are materially hampered in their work by dust which not only obscures their vision but frequently proves injurious to their health, and the present invention is designed to provide a device which may be readily attached to or detached from a land vehicle, particularly those employed in farm work, to provide a blower for directing the dust away from the operator of the vehicle to overcome this condition.

Other objects and advantages of the invention will hereinafter become more fully apparent from the following description of the drawing, which illustrates a preferred embodiment thereof, and wherein:

Figure 1 is a side elevational view showing the attachment applied to the ground wheel of a vehicle, Figure 2 is a vertical sectional view, partly in elevation, on an enlarged scale, of the same, and Figure 3 is a horizontal sectional view taken along the line 3—3 of Figure 2.

Referring more particularly to the drawing, wherein like reference characters designate like or corresponding parts throughout the different views, 10 designates generally a ground wheel of a vehicle, not shown, and 11 designates a portion of an axle of wheel 10 which is enclosed by the axle housing 12. The attachment, designated generally 13, comprising this invention, while primarily adapted to be attached to a rear wheel of a tractor, may be applied to any wheel of any type of land vehicle depending upon the relative position of the operator's seat to the ground wheels and obstructions therebetween which might affect the positioning of the attachment 13, as will hereinafter become apparent.

The attachment 13 includes a plate 14 which is permanently fixed, in any suitable manner, to the axle housing 12 to receive the base plate 15 of the standard 16 which is detachably secured thereto by the fastenings 17. Standard 16 rises from the axle housing 12 and is provided with the spaced laterally projecting arms 18 and 19 having the bearings 20 and 21, respectively, at their free ends. Bearings 20 and 21 are provided with the lubricating passages 22 normally closed by the threaded plugs 23.

A shaft 24 is formed of telescoping sections including the tubular section 25 and the section 26 which is slidably mounted in one end of the section 25. The opposite end of the tubular section 25 is internally threaded to receive the threaded shank 27 of the tapered head 28 which is adapted to be journaled in the lower bearing member 21 which is likewise tapered and closed at its lower end to receive the head 28. Shaft 24 projects upwardly through the bearing member 20 and is provided with a removable and adjustable collar 29 for engaging beneath bearing member 20 to prevent longitudinal movement of the shaft relatively to the bearings. Sections 25 and 26 are made extensible for varying the length of the shaft 24, for a purpose which will hereinafter be explained, and are adapted to be fixed in their adjusted position by means of a set screw 30. Section 26 adjacent its upper free end is provided with a fixed or integrally formed collar 31 forming a stem portion 32 thereabove for receiving a socket type hub 33 which is detachably fixed thereto by a set screw 34 and which is provided with a plurality of radiating arms 35 to which are secured the fan blades 36. The pitch of the fan blades 36 may be governed as desired by the pitch of the arms 35 to which they are secured.

A small beveled gear 37 is detachably fixed by means of a set screw 38 to the shaft 24 between bearings 20 and 21 for engaging the teeth of an annular beveled gear 39 which is provided with the annular offset portion 40 which is detachably secured by the fastenings 41 to the hub portion 42 of the wheel 10 for driving the fan 36 when the wheel 10 is revolved.

From the foregoing it will be seen, that when the wheel 10 is revolved by the movement of the land vehicle its rotation will be imparted to the shaft 24 and fan blades 36 by the gears 37 and 39 and as the gear 39 is substantially larger than the gear 37 the shaft 24 will be driven at increased speed relatively to the wheel 10. Standard 16 is adapted to be mounted so that the shaft 24 will be directed toward the operator of the vehicle of which the wheel 10 forms a part so that the draft from the fan blades 36 will be directed toward the operator of the vehicle to create a draft to blow dust away from the operator while the vehicle is in motion. It will be obvious, that the attachment 13 may be readily detached from a vehicle by removing the fastenings 17 after which the annular gear 39 may be detached if desired or may be left in position until the fan is again required. If desired, the annular gear 39 could be formed permanently on the wheel 10 and where the attachment 13 is to be used on a plurality of vehicles each could be provided with a gear 39 to simplify the application or removal of the attachment 13. The attachment 13 may be rendered inoperative, without being removed, by loosening the set screw 38 and raising the gear 37 out of engagement with the gear 39. Collar 29 prevents movement of the shaft 24 longitudinally of the bearings 20 and 21 to hold the gears 37 and 39 in a meshed or released position.

Various modifications and changes are contemplated and may be resorted to provided they fall within the spirit and scope of the invention as hereinafter defined by the appended claim.

I claim as my invention:

In an attachment for land vehicles, a plate secured to an axle housing of a vehicle, a standard having a base plate detachably secured to said first mentioned plate and rising therefrom, bearing members secured to and projecting laterally from said standard, a shaft formed of telescoping sections having one end journaled in said bearings, a fan detachably fixed to the opposite end of said shaft, said sections being extensible for varying the position of the fan, means for retaining the sections in adjusted position, a beveled gear fixed to said shaft adjacent its first mentioned end, and an annular beveled gear fixed to a ground wheel of the vehicle and in mesh with said beveled gear for driving the fan.

WILLIAM PRESTON PROCK.